(12) United States Patent
Groweg

(10) Patent No.: US 11,365,808 B2
(45) Date of Patent: Jun. 21, 2022

(54) O-RING GLAND FOR DOWNHOLE TOOL

(71) Applicant: John F. Groweg, Houston, TX (US)

(72) Inventor: John F. Groweg, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 94 days.

(21) Appl. No.: 16/820,940

(22) Filed: Mar. 17, 2020

(65) Prior Publication Data

US 2020/0309266 A1  Oct. 1, 2020

Related U.S. Application Data

(60) Provisional application No. 62/824,861, filed on Mar. 27, 2019.

(51) Int. Cl.
*F16J 15/322* (2016.01)
*F16J 15/00* (2006.01)
*E21B 33/10* (2006.01)

(52) U.S. Cl.
CPC ............. *F16J 15/322* (2013.01); *E21B 33/10* (2013.01); *F16J 15/002* (2013.01); *E21B 2200/01* (2020.05)

(58) Field of Classification Search
CPC .. F16J 15/00; F16J 15/32; F16J 15/322; F16J 15/002; F16J 15/162; F16J 15/166; F16J 15/40; F16J 15/403; F16J 15/406; E21B 33/10; E21B 41/0042; E21B 2200/00; E21B 2200/01

USPC .......................................................... 277/549
See application file for complete search history.

(56) References Cited

U.S. PATENT DOCUMENTS

| | | | | |
|---|---|---|---|---|
| 5,123,662 | A * | 6/1992 | Sugimura | F16J 15/062 277/584 |
| 5,611,547 | A * | 3/1997 | Baugh | E21B 33/1208 277/336 |
| 7,828,301 | B2 * | 11/2010 | Briscoe | F16J 15/062 277/611 |
| 8,283,402 | B2 * | 10/2012 | Slay | C08J 5/005 524/495 |
| 8,794,638 | B2 | 8/2014 | Tuckness et al. | |
| 9,611,937 | B2 * | 4/2017 | Roy | E21B 41/00 |
| 2013/0180733 | A1 | 7/2013 | Bradshaw et al. | |
| 2014/0084547 | A1 * | 3/2014 | Stokes | E21B 33/1216 277/336 |
| 2014/0175750 | A1 | 6/2014 | Keene et al. | |

OTHER PUBLICATIONS

International Search Report and Written Opinion for International Application No. PCT/US2020/024958; International Filing Date Mar. 26, 2020; Report dated Jul. 14, 2020 (pp. 1-8).

* cited by examiner

*Primary Examiner* — Nathan Cumar
(74) *Attorney, Agent, or Firm* — Cantor Colburn LLP

(57) ABSTRACT

A downhole tool body includes an outer surface having at least one O-ring gland. The at least one O-ring gland includes a first contour having a first radius greater than about 0.035" (R0.89 mm) and a second contour having a second radius greater than about 0.035" (R0.89 mm). A backup ring is arranged in the O-ring gland. The backup ring includes a gland contour having a radius that is complimentary to the first radius.

16 Claims, 4 Drawing Sheets

US 11,365,808 B2

O-RING GLAND FOR DOWNHOLE TOOL

CROSS REFERENCE TO RELATED APPLICATION

This application claims the benefit of an earlier filing date from U.S. Provisional Application Ser. No. 62/824,861 filed Mar. 27, 2019, the entire disclosure of which is incorporated herein by reference.

BACKGROUND

In the resource exploration and recovery industry, various tools include external sleeves or covers that are sealed. The tools may include seal grooves that receive a seal, such as an O-ring. The O-ring resides in the seal groove and seals against an inner surface of the cover or sleeve. In some cases, a backup ring may support the seal in the seal groove. The seal groove is formed in the tool and typically includes small radius corners that act as stress concentrators. As such, stress relief grooves are formed in the tool on either side of the seal groove.

The stress relief groove includes large radius interior corners that support and direct the stress imparted to the tool away from the seal groove. The need to include stress relief grooves increases tool size. That is, an overall length of the tool must be such that seal grooves and stress relief grooves may be accommodated. Accordingly, the art would be receptive to a system that reduces the need for stress relief grooves allowing the tool to include a smaller form factor.

SUMMARY

Disclosed is a downhole tool body including an outer surface having at least one O-ring gland. The at least one O-ring gland includes a first contour having a first radius greater than about 0.035" (R0.89 mm) and a second contour having a second radius greater than about 0.035" (R0.89 mm). A backup ring is arranged in the O-ring gland. The backup ring includes a gland contour having a radius that is complimentary to the first radius.

Also disclosed is a resource exploration and recovery system including a first system, a second system including one or more tubulars extending through a formation to the first system, and a downhole tool configured for use in the second system. The downhole tool extends into the formation and includes a downhole tool body having an outer surface including at least one O-ring gland. The at least one O-ring gland includes a first contour having a first radius greater than about 0.035" (R0.89 mm) and a second contour having a second radius greater than about 0.035" (R0.89 mm). A backup ring is arranged in the O-ring gland. The backup ring includes a gland contour having a radius that is complimentary to the first radius.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
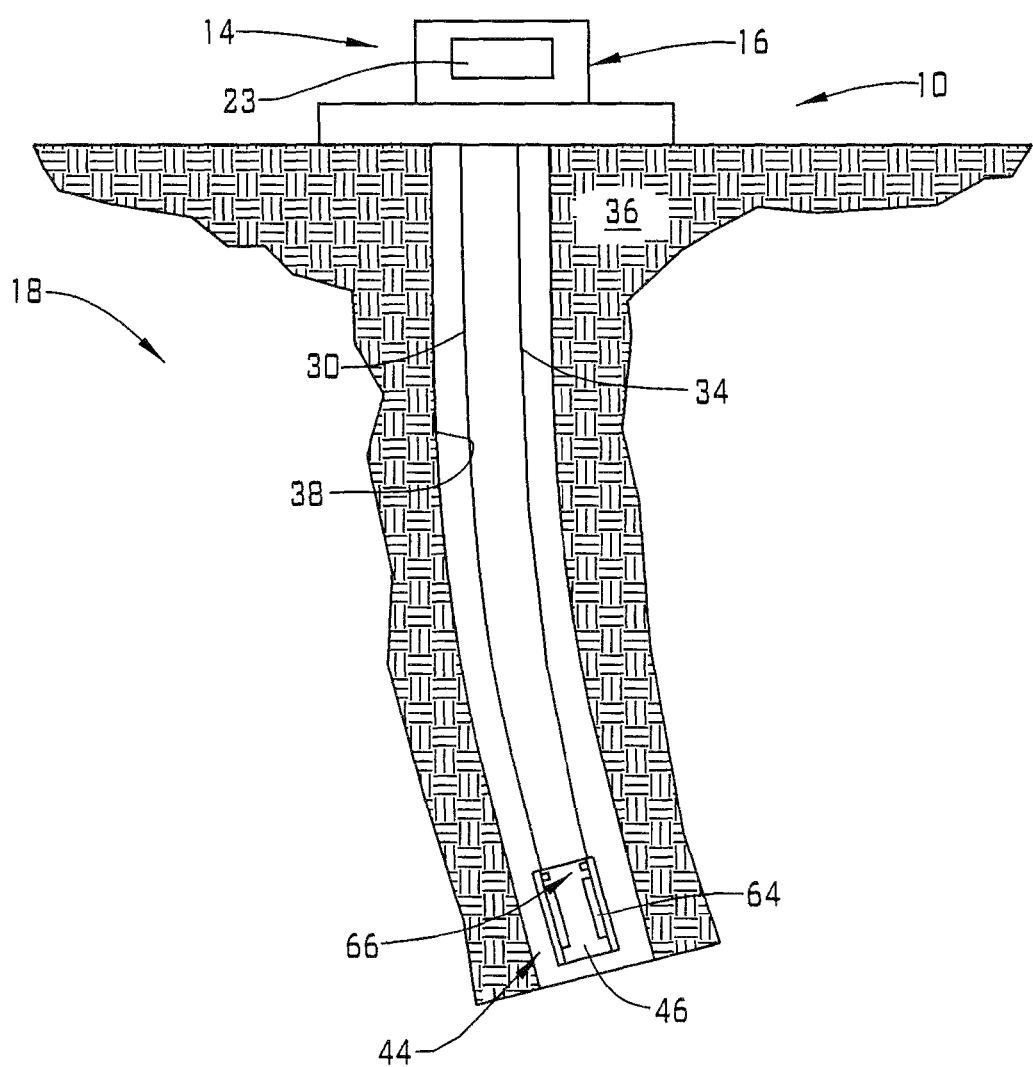
FIG. 1 depicts a resource exploration and recovery system including a downhole tool having an O-ring gland formed in accordance with an aspect of an exemplary embodiment.
Figure 2:
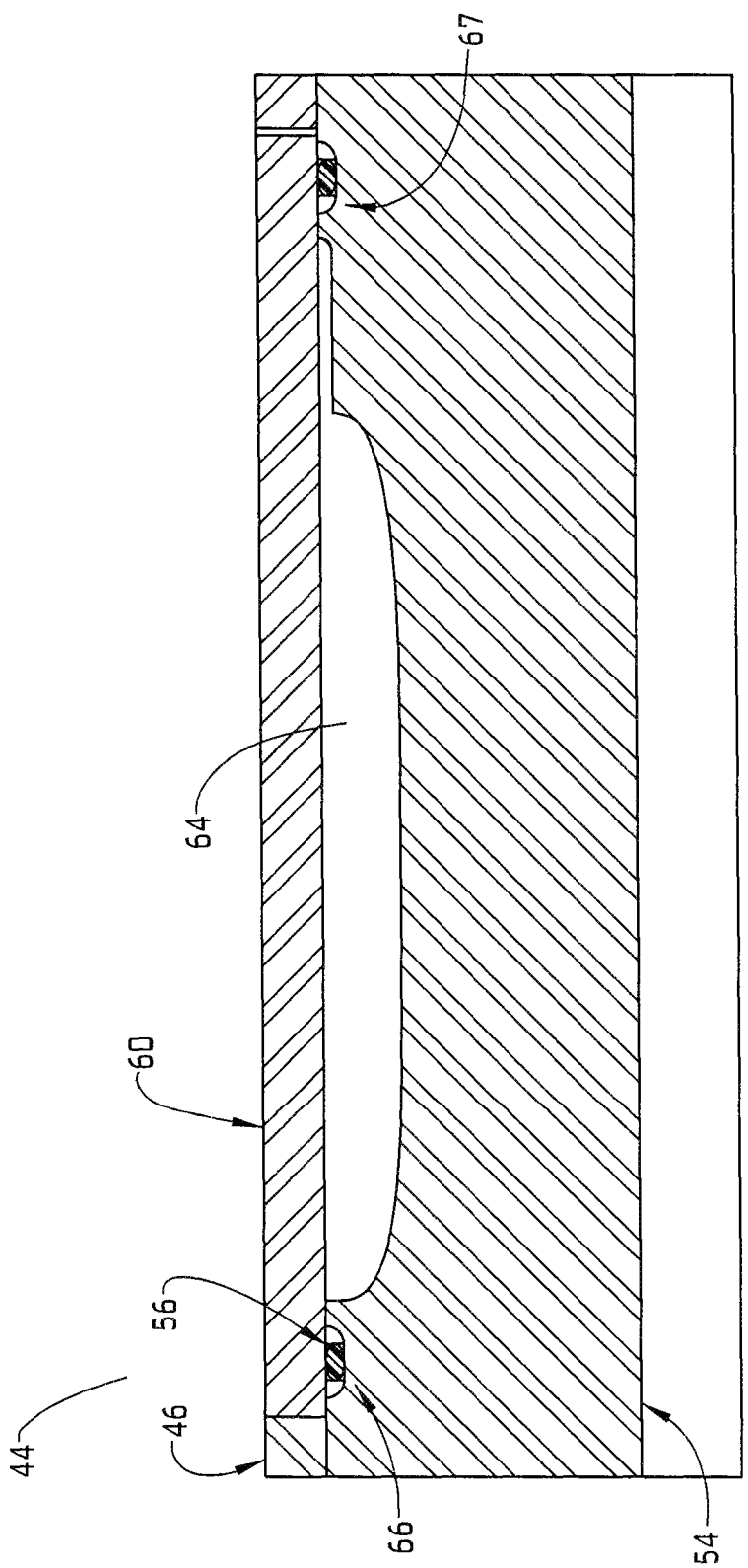
FIG. 2 depicts a partial, cross-sectional view of the downhole tool of FIG. 1 including an O-ring gland, in accordance with an aspect of an exemplary embodiment.

A resource exploration and recovery system, in accordance with an exemplary embodiment, is indicated generally at 10, in FIGS. 1 and 2. Resource exploration and recovery system 10 should be understood to include well drilling operations, completions, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a downhole system.

First system 14 may include a control system 23 that may provide power to, monitor, communicate with, and/or activate one or more downhole operations as will be discussed herein. Surface system 16 may include additional systems such as pumps, fluid storage systems, cranes and the like (not shown). Second system 18 may include a tubular string 30 that extends into a wellbore 34 formed in formation 36. Wellbore 34 includes an annular wall 38 which may be defined by a surface of formation 36.

In an embodiment, tubular string 30 may support a downhole tool 44 that is shown in the form of a drill collar 46. It should be understood however, that downhole tool 44 may take on various forms. Further, downhole tool 44 need not be limited to "tools" and could take the form of a downhole component. Referring to FIG. 2, and with continued reference to FIG. 1, drill collar 46 includes a drill collar body 54 having an outer surface 56. A sleeve 60 is provided about outer surface 56. Sleeve 60 may provide protection to components (not shown) arranged in a cavity 64 formed in drill collar body 54.

Sleeve 60 may protect the components from mechanical damage and may also provide a fluid tight barrier. To that end, drill collar body 54 includes a first seal system 66 arranged in a first side (not separately labeled) of cavity 64 and a second seal system 67 arranged on a second side (also not separately labeled) of cavity 64. Sleeve 60 interacts with first and second seal systems 66 and 67 to prevent ingress of downhole fluids into cavity 64

Figure 3:
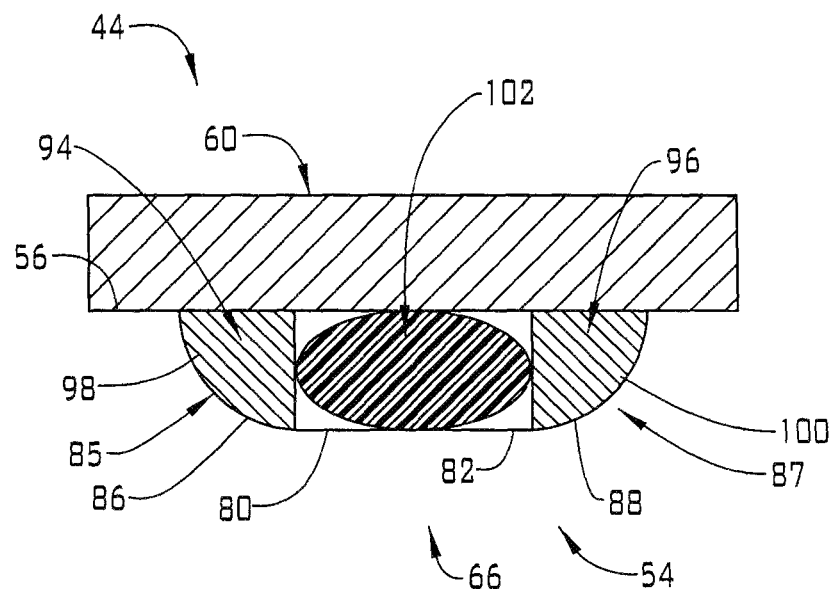
FIG. 3 depicts a cross-sectional view of a portion of the downhole tool of FIG. 2 illustrating the O-ring gland, in accordance with an aspect of an exemplary embodiment.

Reference will now follow to FIG. 3 in describing seal system 66 with an understanding that seal system 67 may include similar structure. Seal system 66 includes an O-ring gland 80 formed in drill collar body 54. O-ring gland 80 defines an O-ring receiving zone 82. In accordance with an exemplary aspect, O-ring gland 80 includes a first contour 85 having a first radius 86 and a second contour 87 having a second radius 88. In an embodiment, first radius 86 is greater than about R0.035" (R0.89 mm). Second radius 88 is greater than about R0.035" (R0.89 mm). The size of first radius 86 and second radius 88 is selected to reduce stress concentrations that may form in O-ring gland 80.

In an embodiment, a backup ring 94 may be arranged in O-ring gland 80. Another backup ring 96 may also be arranged in O-ring gland 80 spaced from backup ring 94. Backup ring 94 includes a first gland contour 98 and another backup ring 96 includes a second gland contour 100. First gland contour 98 compliments first contour 85 of O-ring gland 80. Similarly, second gland contour 100 compliments second contour 87 of O-ring gland 80.

In an embodiment, first and another backup rings 94 and 96 are sized to establish a selected volume for O-ring receiving zone 82 that accommodates an O-ring 102. First and another backup rings 94 and 96 may be formed from a variety of materials including metals, metal composites, plastics, elastomers, and the like. Further, while shown as being similar in thickness, first and another backup rings may various dimensionally to establish a desired axial placement of O-ring 102 in O-ring receiving zone 82.

Figure 4:
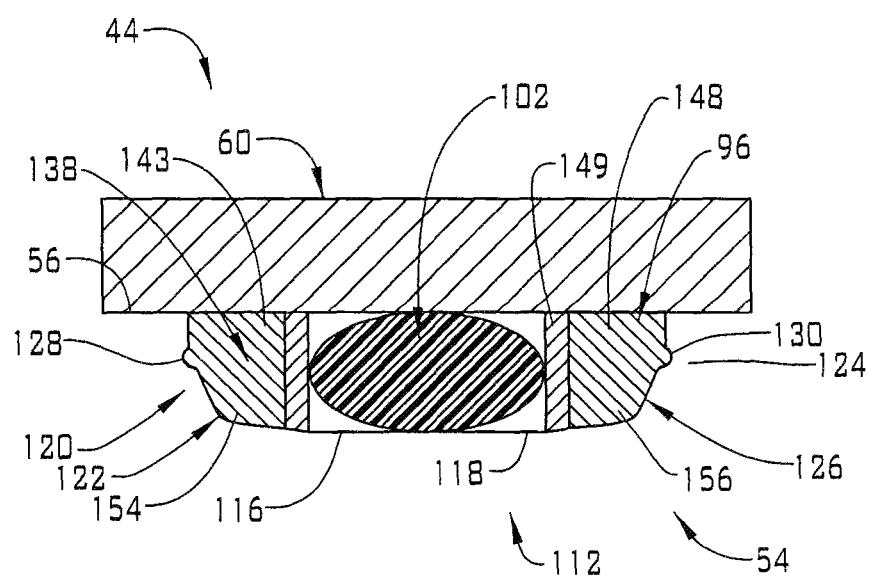
FIG. 4 depicts a cross-sectional view of a portion of the downhole tool of FIG. 2 illustrating the O-ring gland, in accordance with another aspect of an exemplary embodiment.

Reference will now follow to FIG. 4, wherein like reference numbers represent corresponding parts in the respective views, in describing a seal system 112 formed in accordance with another aspect of an exemplary embodiment. Seal system 112 includes an O-ring gland 116 that defines an O-ring receiving zone 118. O-ring gland 116 includes a first gland contour 120 having a first radius 122 and a second glad contour 124 having a second radius 126. In an exemplary aspect, first radius 122 defines a first compound radius 128 and second radius 126 defines a second compound radius 130.

First compound radius 128 includes a first radius portion (not separately labeled) that is greater than about R0.035" (R0.89 mm). Second compound radius 130 includes a second radius portion (also not separately labeled) that is greater than about R0.035" (R0.89 mm). The first and second radius portions may be defined by a segment of first and second compound radii 128 and 130 or may represent a cumulative dimension of each of the first compound radius 128 and second compound radius 130.

In an embodiment, a backup ring system 138 may be arranged in O-ring gland 116. Another backup ring system 140 may also be arranged in O-ring gland 116 spaced from backup ring system 138. Backup ring system 138 includes a first spacer ring 143 and a first backup ring 144. Another backup ring system 140 includes a second spacer ring 148 and a second backup ring 149. First and second backup rings 144 and 149 may be sized to establish a selected volume for O-ring receiving zone 118.

In an embodiment, first spacer ring 143 includes a first gland contour 154 and second spacer ring 148 includes a second gland contour 156. First gland contour 154 compliments first contour 120 of O-ring gland 116. Similarly, second gland contour 156 compliments second contour 124 of O-ring gland 80. First and second spacer rings 143 and 148 and first and second backup rings 144 and 149 may be formed from a variety of materials including metals, metal composites, plastics, elastomers, and the like. Further, while shown as being similar in thickness, first and second backup rings 144 and 149 may vary dimensionally to establish a desired axial placement of O-ring 102 in O-ring receiving zone 118.

Figure 5:
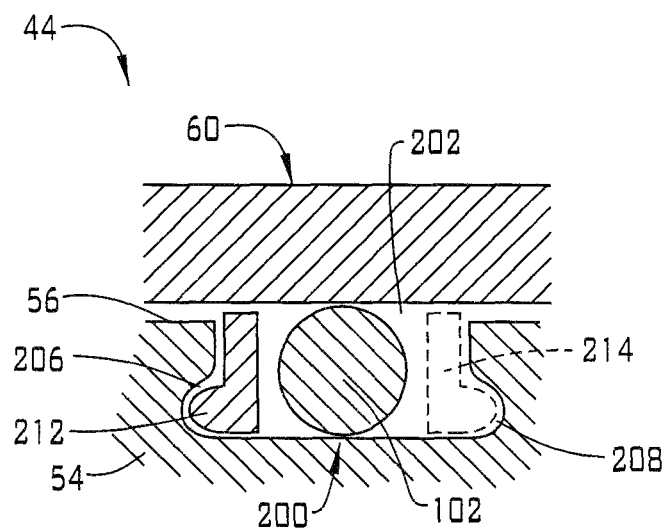
FIG. 5 depicts a cross-sectional view of a portion of the downhole tool of FIG. 2 illustrating the O-ring gland, in accordance with yet another aspect of an exemplary embodiment.

It should be understood that the O-ring glands may take on various geometries. For example, FIG. 5 shows an O-ring gland 200 defining an O-ring receiving zone 202. O-ring gland 200 includes a first contour 206 and a second glad contour 208. First and second gland contours 206 and 208 take the form of undercuts that extend axially into drill collar body 54 in opposite directions. Further, each gland contour 206, 208 includes a radius that is greater than about R0.035" (R0.89 mm) as discussed herein. O-ring glad 200 is receptive of a first backup ring 212 that includes a gland contour (not separately labeled) that corresponds to first gland contour 206. O-ring gland 200 may also include a second backup ring 214 that includes a gland contour (not separately labeled) that corresponds to second gland contour 208.

Figure 6:
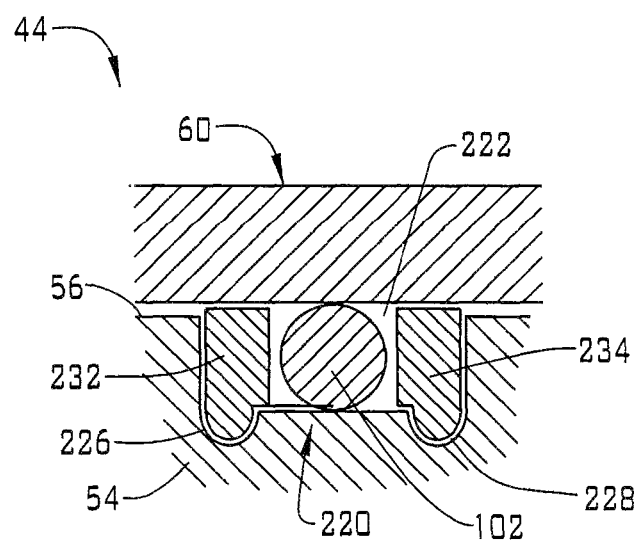
FIG. 6 a cross-sectional view of a portion of the downhole tool of FIG. 5 illustrating the O-ring gland, in accordance with another aspect of an exemplary embodiment.

FIG. 6 depicts an O-ring gland 220 in accordance with yet another exemplary embodiment. O-ring glad 220 defines an O-ring receiving zone 222. O-ring gland 220 includes a first contour 226 and a second glad contour 228. First and second gland contours 226 and 228 take the form of undercuts that extend radially inwardly into drill collar body 54. Further, each gland contour 226, 228 includes a radius that is greater than about R0.035" (R0.89 mm) as discussed herein. O-ring glad 220 is receptive of a first backup ring 232 that includes a gland contour (not separately labeled) that corresponds to first gland contour 226. O-ring gland 220 may also include a second backup ring 234 that includes a gland contour (not separately labeled) that corresponds to second gland contour 228.

At this point, it should be understood that the particular design of the O-ring glands of the present invention eliminate the need to include additional stress relieve elements into the drill collar body. In this manner, an overall axial length of the drill collar body may be reduced without while still providing a robust construction designed to accommodate operational stresses.

Embodiment 1: A downhole tool body comprising: an outer surface including at least one O-ring gland, the at least one O-ring gland including a first contour having a first radius greater than about 0.035" (R0.89 mm) and a second contour having a second radius greater than about 0.035" (R0.89 mm); and a backup ring arranged in the O-ring gland, the backup ring including a gland contour having a radius that is complimentary to the first radius.

Embodiment 2: The downhole tool body according to any previous embodiment, further comprising: another backup ring arranged in the O-ring gland, the another backup ring including a gland.

Embodiment 3: The downhole tool body according to any previous embodiment, wherein the backup ring comprises a backup ring set.

Embodiment 4: The downhole tool body according to any previous embodiment, wherein each of the backup ring and the another backup ring define a spacer ring.

Embodiment 5: The downhole tool body according to any previous embodiment, wherein the another backup ring comprises a backup ring set.

Embodiment 6: The downhole tool body according to any previous embodiment, wherein the first radius comprises a first compound radius.

Embodiment 7: The downhole tool body according to any previous embodiment, wherein the second radius comprises a second compound radius.

Embodiment 8: The downhole tool body according to any previous embodiment, wherein the backup ring is formed from one of a metal, and a plastic material.

Embodiment 9: The downhole tool body according to any previous embodiment, wherein the another backup ring is formed from one of a metal, and a plastic material.

Embodiment 10: The downhole tool body according to any previous embodiment, wherein the backup ring and the another backup ring are sized to establish a selected volume of the at least one O-ring gland.

Embodiment 11: The downhole tool according to any previous embodiment, wherein the downhole tool body defines a drill collar body.

Embodiment 12: A resource exploration and recovery system comprising: a first system; a second system including one or more tubulars extending through a formation to the first system; a downhole tool configured for use in the second system, the downhole tool extending into the formation and including a downhole tool body comprising: an outer surface including at least one O-ring gland, the at least one O-ring gland including a first contour having a first radius greater than about 0.035" (R0.89 mm) and a second contour having a second radius greater than about 0.035" (R0.89 mm); and a backup ring arranged in the O-ring gland, the backup ring including a gland contour having a radius that is complimentary to the first radius.

Embodiment 13: The resource exploration and recovery system according to any previous embodiment, further comprising: another backup ring arranged in the O-ring gland, the another backup ring including a gland contour having a contour that is complimentary to the second radius.

Embodiment 14: The resource exploration and recovery system according to any previous embodiment, wherein the backup ring comprises a backup ring set.

Embodiment 15: The resource exploration and recovery system according to any previous embodiment, wherein each of the backup ring and the another backup ring define a spacer ring.

Embodiment 16: The resource exploration and recovery system according to any previous embodiment, wherein the another backup ring comprises a backup ring set.

Embodiment 17: The resource exploration and recovery system according to any previous embodiment, wherein the first radius comprises a first compound radius.

Embodiment 18: The resource exploration and recovery system according to any previous embodiment, wherein the second radius comprises a second compound radius.

Embodiment 19: The resource exploration and recovery system according to any previous embodiment, wherein each of the backup ring and the another backup ring is formed from one of a metal, and a plastic material.

Embodiment 20: The resource exploration and recovery system according to any previous embodiment, wherein the backup ring and the another backup ring are sized to establish a selected volume of the at least one O-ring gland.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole tool body comprising:
    an outer surface including at least one O-ring gland, the at least one O-ring gland including a first contour having a first radius greater than about 0.035" (R0.89 mm) and a second contour having a second radius greater than about 0.035" (R0.89 mm) to reduce stress concentration; and
    a backup ring arranged in the O-ring gland, the backup ring including a contour having a radius that is complimentary to the first radius.

2. The downhole tool body according to claim 1, further comprising: another backup ring arranged in the O-ring gland, the another backup ring including a contour having another radius that is complimentary to the second radius.

3. The downhole tool body according to claim 2, wherein each of the backup ring and the another backup ring define a spacer ring.

4. The downhole tool body according to claim 2, wherein the another backup ring is formed from one of a metal, and a plastic material.

5. The downhole tool body according to claim 2, wherein the backup ring and the another backup ring are sized to establish a selected volume of the at least one O-ring gland.

6. The downhole tool body according to claim 1, wherein the first contour further comprises a first compound radius.

7. The downhole tool body according to claim 6, wherein the second contour further comprises a second compound radius.

8. The downhole tool body according to claim 1, wherein the backup ring is formed from one of a metal, and a plastic material.

9. The downhole tool body according to claim 1, wherein the downhole tool body defines a drill collar body.

10. A resource exploration and recovery system comprising:
- a first system;
- a second system including one or more tubulars extending through a formation to the first system;
- a downhole tool configured for use in the second system, the downhole tool extending into the formation and including a downhole tool body comprising:
  - an outer surface including at least one O-ring gland, the at least one O-ring gland including a first contour having a first radius greater than about 0.035" (R0.89 mm) and a second contour having a second radius greater than about 0.035" (R0.89 mm) to reduce stress concentration; and
  - a backup ring arranged in the O-ring gland, the backup ring including a contour having a radius that is complimentary to the first radius.

11. The resource exploration and recovery system according to claim 10, further comprising: another backup ring arranged in the O-ring gland, the another backup ring including another contour having another radius that is complimentary to the second radius.

12. The resource exploration and recovery system according to claim 11, wherein each of the backup ring and the another backup ring define a spacer ring.

13. The resource exploration and recovery system according to claim 11, wherein each of the backup ring and the another backup ring is formed from one of a metal, and a plastic material.

14. The resource exploration and recovery system according to claim 11, wherein the backup ring and the another backup ring are sized to establish a selected volume of the at least one O-ring gland.

15. The resource exploration and recovery system according to claim 10, wherein the first contour further comprises a first compound radius.

16. The resource exploration and recovery system according to claim 15, wherein the second contour further comprises a second compound radius.

* * * * *